June 18, 1929.　　　J. D. RAUCH　　　1,717,892
CLUTCH MECHANISM
Filed Jan. 9, 1928
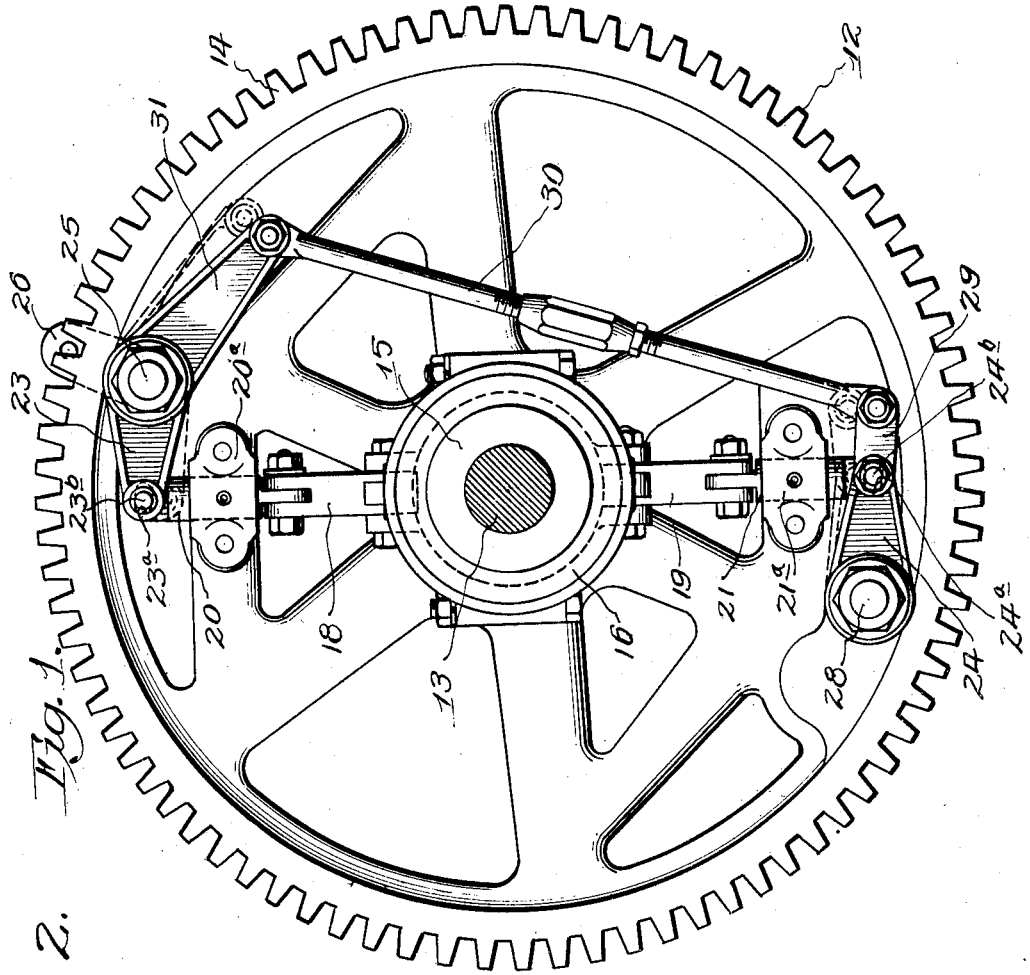
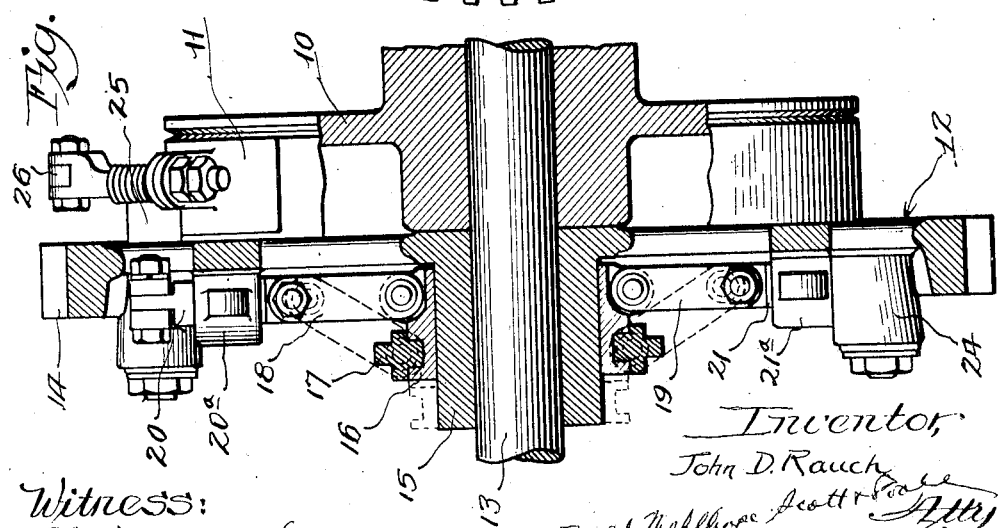
Inventor,
John D. Rauch
Witness:

Patented June 18, 1929.

1,717,892

UNITED STATES PATENT OFFICE.

JOHN D. RAUCH, OF LIMA, OHIO, ASSIGNOR TO THE OHIO POWER SHOVEL COMPANY, OF LIMA, OHIO, A CORPORATION OF OHIO.

CLUTCH MECHANISM.

Application filed January 9, 1928. Serial No. 245,601.

This invention relates to improvements in friction band clutches, and has for its principal object to provide a new and improved clutch of the type above described.

More specifically, my invention relates to improvements in the type of friction clutch disclosed in Patent No. 866,282 issued jointly to me and J. P. Karr under date of September 17, 1907, and disclosing broadly an external contracting band clutch member, and a balanced toggle arrangement for actuating said band at a single point.

The principal advantage of the balanced toggle arrangement of the type described, is to equalize the forces on opposite sides of the shifting clutch collar and thus eliminate friction which would otherwise be set up if all of the operating force were applied through one toggle link on one side of the shaft. In carrying out my present invention, I utilize the principle of the double opposed equalized toggle links, but construct the same in an improved manner wherein the toggle links instead of being connected directly to the operating levers at their outer ends are connected indirectly thereto through plungers interposed between said toggle links and said operating levers, said plungers being guided for radial movement relative to the drive gear with which the clutch mechanism rotates, and thereby providing a more rigid and durable construction with an increased range of movement of the operating levers, as will appear from the following description.

The invention may best be understood by reference to the accompanying drawings, in which Figure 1 is a face view of a drive gear carrying the clutch actuating elements thereon, Figure 2 is a vertical section of the drive gear shown in Figure 1 together with cooperating clutch elements and cooperating friction band, the latter elements being shown partially in elevation.

Referring now to details of the mechanism shown in the drawings, the clutch includes a drum 10 having a friction band 11 mounted thereon, and actuating means for said friction band mounted on a suitable drive member 12 concentric with said drum on shaft 13. In the form shown, the drive member 12 is in the form of a gear having a toothed periphery 14 and a hub 15.

The clutch actuating mechanism is mounted on and carried with the gear 12 and includes a longitudinally slidable sleeve 16 with a shifting collar 17 grooved therein and shiftable by any suitable means, such as a yoke (not shown), in the usual manner. A pair of operatively disposed toggle links 18 and 19 are pivoted at their outer ends to plungers 20 and 21 guided for radial movement respectively in brackets 20ᵃ and 21ᵃ fixed to the face of the gear 12. The ends of the plungers 20 and 21 project beyond the ends of their guide brackets and are connected to levers 23—24 respectively.

The lever 23 forms the direct actuating member for contracting the band 11, in the form shown said lever being pivotally mounted on a pin 25 which extends through the gear 12 and is operatively connected to the free end of the friction band 11 through lever 26, as best shown in Figure 1. The lever 24 connected to the other plunger 21 forms in effect an idler lever pivoted to the gear 12 on pin 28 but having connection to the first mentioned lever 23 through an equalizing connection including arm 29 forming an extension of lever 24, equalizing bar 30, and arm 31, forming a part of the actuating lever 23, as clearly shown in Figure 1.

In order to permit freedom of movement of the levers 23 and 24 relative to the plungers 18 and 19, said levers are preferably provided with slots 23ᵃ, 24ᵃ in which the respective connecting pins 23ᵇ, 24ᵇ are permitted to move.

The operation of the clutch device above described will now be understood. With the shifting sleeve 16 in its innermost position, the toggle links 18 and 19 are in substantial vertical alignment with each other so as to force the plungers radially outward and throw the levers 23, 24 to their extreme outermost position. The movement of lever 23 serves to contract the friction band 11 into frictional engagement with its drum 10, in the usual manner. At the same time, the pressure effective upon the idler lever 24 is also effective upon the friction band through the medium of arm 29, equalizing rod 30 and lever 31.

It will be observed further that the provision of the plungers 20 and 21 interposed between the toggle links 18 and 19 and their respective levers 23 and 24, provides an especially rigid and effective construction wherein said toggle links may be made somewhat shorter than in previous constructions so as to increase the range of movement of the lever arms 23 and 24 with the same amount of longitudinal movement of the shifting sleeve 16.

While I have illustrated and described the particular embodiment of my invention, it will be understood that I do not wish to be limited to the exact construction shown and described, but that various changes and modifications may be made without departing from the spirit and scope of my invention.

I claim:

In a clutch, a shaft, a clutch member thereon, and friction clutch means carried thereby comprising a friction band, two levers pivoted at opposite sides of said shaft, one of said levers being directly connected to said band for actuating the same, and an equalizing member connecting the other indirectly to said band whereby engaging movement is transmitted to said band from both levers, and actuating means for said levers comprising a sliding member mounted concentric with said shaft, a pair of toggle links pivoted on opposite sides of said sliding member, plungers interposed between each of said toggle links and one of said levers, and guide means for said plungers on said rotatable member.

Signed at Lima, Ohio, this 4th day of January, 1928.

JOHN D. RAUCH.